(12) United States Patent
Genderjahn et al.

(10) Patent No.: US 10,525,813 B2
(45) Date of Patent: Jan. 7, 2020

(54) HYDRAULIC BEARING AND MOTOR VEHICLE HAVING SUCH A HYDRAULIC BEARING

(71) Applicant: ContiTech Vibration Control GmbH, Hannover (DE)

(72) Inventors: Robert Genderjahn, Hannover (DE); Peter Marienfeld, Marklohe (DE)

(73) Assignee: ContiTech Vibration Control GmbH, Hannover (DE)

(*) Notice: Subject to any disclaimer, the term of this patent is extended or adjusted under 35 U.S.C. 154(b) by 0 days.

(21) Appl. No.: 16/005,520

(22) Filed: Jun. 11, 2018

(65) Prior Publication Data

US 2018/0290532 A1 Oct. 11, 2018

Related U.S. Application Data

(63) Continuation of application No. PCT/EP2016/070432, filed on Aug. 31, 2016.

(30) Foreign Application Priority Data

Dec. 11, 2015 (DE) .................. 10 2015 224 937

(51) Int. Cl.
*B60K 5/12* (2006.01)
*F16F 13/18* (2006.01)
(Continued)

(52) U.S. Cl.
CPC .......... *B60K 5/1283* (2013.01); *B60K 5/1208* (2013.01); *F16F 13/105* (2013.01); *F16F 13/18* (2013.01); *F16F 13/264* (2013.01)

(58) Field of Classification Search
CPC ... B60K 5/1283; B60K 5/1208; F16F 13/105; F16F 13/18; F16F 13/264
(Continued)

(56) References Cited

U.S. PATENT DOCUMENTS 4,720,084 A 1/1988 Hollerweger et al.
5,238,232 A * 8/1993 Kobayashi ............ F16F 13/264
188/267

(Continued)

FOREIGN PATENT DOCUMENTS

EP 0163949 A2 12/1985
JP 2006300306 A 11/2006
WO 2013127574 A1 9/2013

OTHER PUBLICATIONS

International search report dated Jan. 3, 2017 of international application PCT/EP2016/070432 on which this application is based.

*Primary Examiner* — John D Walters
(74) *Attorney, Agent, or Firm* — Gregory Adams; David L. Cate

(57) ABSTRACT

A hydraulic bearing has a cylindrical main housing, a load-bearing spring enclosed by the main housing, a work chamber, which is at least partially enclosed by the load-bearing spring, with a work chamber volume filled with hydraulic fluid. The hydraulic bearing further includes a control diaphragm, which is configured to change the work chamber volume, and an actuator. The actuator is coupled to the control diaphragm for deflecting the same. The hydraulic bearing also includes an equalization chamber and a throttle duct hydraulically interconnecting the work chamber and the equalization chamber, and a cylindrical chamber housing is arranged with a first end face on an outer casing side section of the main housing, wherein the equalization chamber is formed by at least a part of an interior of the chamber housing.

17 Claims, 6 Drawing Sheets

(51) Int. Cl.
*F16F 13/26* (2006.01)
*F16F 13/10* (2006.01)

(58) Field of Classification Search
USPC .................................................. 180/291, 300
See application file for complete search history.

(56) References Cited

U.S. PATENT DOCUMENTS

| | | | | |
|---|---|---|---|---|
| 5,601,280 A * | 2/1997 | Nagaya | ................... | F16F 13/26 267/140.14 |
| 9,605,727 B2 * | 3/2017 | Kim | ........................ | F16F 13/22 |

* cited by examiner

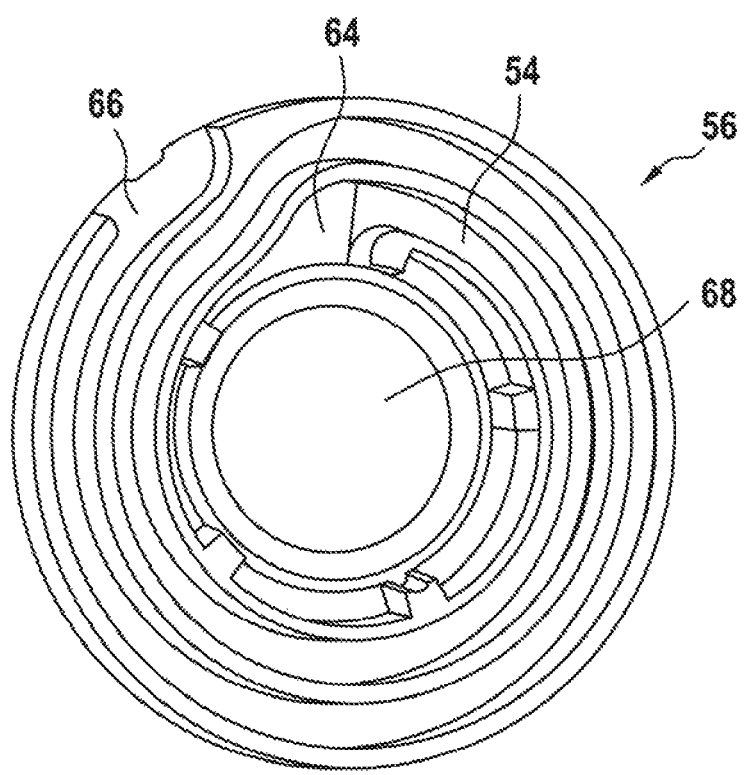

HYDRAULIC BEARING AND MOTOR VEHICLE HAVING SUCH A HYDRAULIC BEARING

CROSS REFERENCE TO RELATED APPLICATION

This application is a continuation application of international patent application PCT/EP2016/070432, filed Aug. 31, 2016, designating the United States and claiming priority from German application 10 2015 224 937.9, filed Dec. 11, 2015, and the entire content of both applications is incorporated herein by reference.

FIELD OF THE INVENTION

The invention relates to a hydraulic bearing having: a cylindrical main housing, a load-bearing spring enclosed by the main housing, a work chamber, at least partially enclosed by the load-bearing spring, with a work chamber volume, wherein the work chamber is filled with hydraulic fluid, a control diaphragm which is configured to change the work chamber volume, an actuator which, for deflecting the control diaphragm, is coupled to the control diaphragm, an equalization chamber, and a throttle duct which extends from the work chamber to the equalization chamber such that the work chamber and the equalization chamber are hydraulically connected.

The invention furthermore relates to a motor vehicle comprising: a vehicle frame, an engine, and a hydraulic bearing which forms a connection, with mounting action, between the engine and the vehicle frame.

BACKGROUND OF THE INVENTION

Hydraulic mounts, also referred to as hydraulic bearings, are known from the prior art. They serve for the elastic support of assemblies, in particular of motor vehicle engines. Such hydraulic bearings arranged for example between an engine and a chassis of a motor vehicle are intended to be used to prevent engine vibrations from being transmitted to the vehicle chassis. Here, consideration should be given to the known conflict in the field of vibration isolation, which consists in the fact that the bearing should firstly be as rigid as possible in order to be able to accommodate high loads or bearing forces, and secondly must have a soft characteristic in order to isolate to the greatest possible extent vibrations that arise over as broad a frequency range as possible.

In their basic version, such hydraulic bearings normally have a rubber element as a load-bearing spring. The rubber element is often in the form of a hollow cone. The load-bearing spring can thus form a casing wall of the work chamber. On the upper end side of the load-bearing spring, it is possible for a connection element for fastening, in particular the engine, to be attached. The connection element is normally a threaded bolt which can be screwed to the engine. On its underside, the load-bearing spring can be coupled to the main housing in order to allow force transmission from the load-bearing spring to the main housing. The main housing can have fastening elements, in particular radially on the outside. These can serve to fasten the main housing to the vehicle chassis.

When the hydraulic bearing is subjected to a load, a force acts on the load-bearing spring in the longitudinal direction of the hydraulic bearing, such that the load-bearing spring elastically deforms. The deformation is also referred to as compression of the load-bearing spring. In this context, consideration should be given to the fact that the work chamber is at least partially enclosed or surrounded by the load-bearing spring. Thus, the work chamber is reduced in size by the compression of the load-bearing spring, with the result that the pressure in the work chamber increases. If the work chamber is now reduced in size by the compression of the load-bearing spring, the pressure in the work chamber increases, such that a part of the hydraulic fluid flows out of the work chamber, through the throttle duct, and into the equalization chamber. The throttle duct represents a flow resistance for the flowing hydraulic fluid, resulting in a damping action.

The damping characteristics of such hydraulic bearings are frequency-dependent on account of their configuration. Static or quasi-static loads below a frequency of 5 Hz are in this case normally accommodated by the load-bearing spring, which exhibits relatively high stiffness.

Low-frequency vibrations, that is, vibrations with frequencies of approximately 5 to 20 Hz, which generally occur with large amplitudes, are damped by the interaction of the two hydraulic chambers via the throttle duct. Here, the damping arises with the flow of at least a part of the hydraulic fluid from the work chamber, through the throttle duct, into the equalization chamber and vice versa.

High-frequency vibrations, that is, vibrations in the frequency range above 20 Hz up to for example 50 Hz, 100 Hz or 200 Hz, are often transmitted with only very little damping, or even virtually without damping, on account of the inertia, viscosity and incompressibility of the hydraulic fluid and/or the high stiffness and inertia of the load-bearing spring. Although the vibrations generally only occur with small amplitudes, they are of relatively high importance owing to their acoustic action.

With regard to the improved isolation of such vibrations, use is made of what are known as actively controlled hydraulic bearings which each have an actuator, in particular an electric linear actuator. Electromagnetic linear actuators which each have a stator and an armature have proven to be particularly expedient. Here, the armature is configured so as to be mounted in a movable manner with respect to the stator, such that the armature can be deflected relative to the stator in a longitudinal direction of the linear actuator. For the hydraulic bearing, the armature is mechanically connected or coupled to a control diaphragm, which is preferably assigned to an end-side wall of the work chamber, in order to form at least a part of a wall for the work chamber. The control diaphragm can be configured to be elastically deformable in its normal direction. By virtue of the armature being mechanically coupled to the control diaphragm, it is possible for the control diaphragm to be deformed in a controlled manner in its normal direction by way of the electromagnetic linear actuator. Here, provision may be made for the armature not to be connected directly to the control diaphragm, but rather for a joint mechanism and/or an armature plunger, for example, to be provided which are arranged between the armature and the control diaphragm in order to transmit movements and/or forces from the armature to the control diaphragm. The joint mechanism and/or the armature plunger are thus intended to be assigned to the armature. With the deformation of the control diaphragm in its normal direction, the hydraulic volume of the work chamber changes, since the control diaphragm forms preferably a wall part with respect to the work chamber. The actuator of the hydraulic bearing thus also serves to control or change the work chamber volume of the work chamber. By actuation of the actuator and the corresponding action on the control diaphragm, a lowering of the dynamic spring rate of the hydraulic bearing in the range of the high-frequency vibrations can be brought about.

In known hydraulic bearings, the equalization chamber is arranged beneath the work chamber, wherein the work chamber and the equalization chamber are separated from one another by a partition. The partition can be formed partially by the control diaphragm. Such a configuration is known for example from the document WO 2013/127574 A1.

In practice, it has been found that increasingly stringent demands are being made of the available vertical installation space for the active hydraulic bearing. Therefore, there is a need to provide a hydraulic bearing which is configured in a more compact manner in the axial direction.

SUMMARY OF THE INVENTION

Therefore, it is an object of the invention to provide a hydraulic bearing that is as compact as possible in the axial direction.

The hydraulic bearing of the invention includes: a cylindrical main housing having an outer casing side; a load-bearing spring enclosed by the main housing; a work chamber at least partially enclosed by the load-bearing spring; the work chamber defining a work chamber volume filled with hydraulic fluid; a control diaphragm configured to change the work chamber volume; an actuator coupled to the control diaphragm for deflecting the control diaphragm; an equalization chamber; a throttle duct extending from the work chamber to the equalization chamber to hydraulically interconnect the work chamber and the equalization chamber; a cylindrical chamber housing defining an interior and having a first end face on a section of the outer casing side of the main housing; and, the equalization chamber being formed by at least a part of the interior of the cylindrical chamber housing.

Thus, according to a first aspect of the invention, a hydraulic bearing is provided, which has: a cylindrical main housing, a load-bearing spring enclosed by the main housing, a work chamber, at least partially enclosed by the load-bearing spring, with a work chamber volume, wherein the work chamber is filled with hydraulic fluid, a control diaphragm which is configured to change the work chamber volume, an actuator which, for deflecting the control diaphragm, is coupled to the control diaphragm, an equalization chamber, a throttle duct which extends from the work chamber to the equalization chamber such that the work chamber and the equalization chamber are hydraulically connected, and a cylindrical chamber housing which is arranged with an associated first end side on an outer casing side portion of the main housing, wherein the equalization chamber is formed by at least a part of an interior of the chamber housing.

The casing-side arrangement of the chamber housing affords the advantage that the hydraulic bearing can be configured in a shorter and thus more compact manner in the axial direction. The axial direction of the hydraulic bearing preferably means the axial direction of the cylindrical main housing. Rather than arranging the equalization chamber beneath the work chamber in a manner separated by a partition, the equalization chamber can now be arranged on the casing side with respect to the main housing. This makes it possible for the actuator to be arranged as close as possible to the control diaphragm, in particular directly at the latter. The hydraulic bearing can thus be shortened in the axial direction by a length which was previously provided in the axial direction for the equalization chamber.

A further advantage is formed by the cylindrical configuration of the chamber housing. This is because the chamber housing is arranged with an associated first end side on an outer casing side portion of the main housing. In practice, it has been found that, in the circumferential direction, not every casing side portion of the main housing is advantageous for the arrangement of the chamber housing. This is because the hydraulic bearing is often arranged immediately next to the object, in particular an engine, which it is intended to support. In one exemplary case, a casing-side region, facing the engine, of the hydraulic bearing would not preferably be suitable for arranging the chamber housing there. An annularly encircling configuration of a chamber housing around the main housing would likewise be unsuitable in this case. Therefore, the cylindrical configuration of the chamber housing affords the advantage that it is arranged for example on an opposite, outer casing portion of the main housing. In this casing side portion, installation space for forming the cylindrical chamber housing can be available. The hydraulic bearing can thus have an asymmetrical configuration, which can arise in particular as a result of the casing-side arrangement of the cylindrical chamber housing with respect to the main housing.

It should be noted that a cylindrical configuration of the chamber housing is not limited to a circular-cylindrical configuration of the chamber housing. Thus, the chamber housing can be formed in an annular manner in cross section. This allows for example a cylindrical configuration of the chamber housing with an oval cross section. Alternatively, the cross section of the cylindrical chamber housing can also be configured in an angular, for example quadrangular, pentagonal, hexagonal manner and/or in the manner of a polygon. In the axial direction, the chamber housing can be configured in a tubular manner. Furthermore, it is possible for the chamber housing to be configured in a conical manner in the axial direction, such that an average diameter of the chamber housing increases or decreases in the axial direction. Other configurations of the chamber housing are also conceivable, however.

The equalization chamber is formed at least by a part of the interior of the chamber housing. In this way, the equalization chamber is also arranged on the casing exterior with respect to the main housing. This makes it easier to seal off the equalization chamber. Furthermore, the arrangement of the equalization chamber outside the main housing has the advantage that the actuator is separable from the hydraulic fluid particularly well. This is because hydraulic fluid in the equalization chamber is now no longer arranged in the immediate vicinity of the actuator, to the side of and/or above the latter.

The casing-side arrangement of the cylindrical chamber housing furthermore affords the advantage that greater installation space, in particular in the radial direction, is available for the actuator. This allows an increase in capacity of the actuator and/or a reduction in the overall height of the actuator in the axial direction of the hydraulic bearing. With the reduction in overall height of the hydraulic bearing in the axial direction, an actuator configured in such a way makes a further reduction in the installation space of the hydraulic bearing in the axial direction possible, such that the hydraulic bearing can be configured in an even more compact manner in the axial direction.

An advantageous configuration of the hydraulic bearing is distinguished by a rolling diaphragm which is fastened in an encircling manner to a casing wall of the chamber housing, such that the rolling diaphragm subdivides the interior of the chamber housing into the equalization chamber and an additional chamber. Such a configuration of the hydraulic bearing is particularly easy to produce as regards the rolling diaphragm. This is because the end side, facing away from the main housing, of the chamber housing can be configured in a still open manner, at least during assembly, such that the rolling diaphragm is insertable into the interior of the chamber housing through the abovementioned end-side opening. Alternatively, the rolling diaphragm can be fastened to the end side of the casing wall which faces away from the main housing. Preferably, the rolling diaphragm is elastically deformable, such that, when hydraulic fluid originating from the work chamber flows in, elastic deformation of the rolling diaphragm can take place, allowing a change, in particular an increase in size, of the volume of the equalization chamber in order to accommodate the hydraulic fluid flowing in.

A further advantageous configuration of the hydraulic bearing is distinguished by the fact that an axial direction of the cylindrical chamber housing is oriented in a radial direction of the main housing or obliquely to the radial direction of the main housing. This affords the advantage that the chamber housing is formed on the outside of or with respect to the main housing. Particularly preferably, the axial direction of the cylindrical chamber housing is oriented in the radial direction of the main housing or parallel to the radial direction of the main housing. This affords the advantage that the chamber housing does not protrude into a region which projects beyond one of the associated end sides in the axial direction of the hydraulic bearing. This supports the particularly compact structural form of the hydraulic bearing in the associated axial direction.

A further advantageous configuration of the hydraulic bearing is distinguished by the fact that the main housing and the chamber housing are formed at least partially integrally. This configuration affords the advantage that the two housings are producible for example by a joint production step. Thus, the main housing and the chamber housing can be formed for example fully integrally. Alternatively, it is possible, for example, for a part of the chamber housing to be formed integrally with the main housing. Thus, it is possible for example for at least a part of the casing wall of the chamber housing to extend outward away from a casing wall of the main housing. If the casing housing is configured in a multipart manner, it is possible here for a part of the casing wall of the chamber housing to be formed integrally with the casing wall of the main housing. An at least further part of the chamber housing can be fastened mechanically to that part of the chamber housing that is formed integrally with the main housing. The at least partially integral formation of the main housing and of the chamber housing affords the advantage of easy installation of the rolling diaphragm. Thus, the latter can be fastened for example by two parts of the chamber housing, wherein one of the two parts is formed integrally with the main housing.

A further advantageous configuration of the hydraulic bearing is distinguished by the fact that the main housing and the chamber housing are formed separately, wherein the chamber housing is fastened to the main housing. This configuration affords the advantage that the chamber housing and the main housing can be manufactured separately and/or in parallel. Furthermore, different production materials can be provided for the chamber housing and the main housing, the materials withstanding for example the loads that are foreseeable during operation, without furthermore unnecessarily increasing the weight of the hydraulic bearing.

In one example, the chamber housing can be fastened to the main housing in a force-fitting, form-fitting and/or cohesive manner. Thus, the chamber housing can be fastened to the main housing for example by a screw connection. Alternatively, the chamber housing and the main housing can be formed such that, when the chamber housing is fastened to the main housing, a clip-type connection or snap-fitting connection arises. The abovementioned features and advantages can be provided and/or configured analogously for a connection between two parts of the chamber housing.

A further advantageous configuration of the hydraulic bearing is distinguished by the fact that the throttle duct is formed at least partially by a liquid duct of a throttle unit, wherein the throttle unit is arranged in the main housing beneath the load-bearing spring. The liquid duct can in this case act as a hydraulic resistance for the hydraulic fluid which flows from the work chamber to the equalization chamber, or vice versa. Therefore, the liquid duct of the throttle unit is also suitable for forming at least a part of the throttle duct. The arrangement of the throttle unit beneath the load-bearing spring also affords the possibility for the throttle unit to form at least a part of a wall for delimiting the work chamber. Thus, the throttle unit can have a dual function, specifically the formation of at least a part of the wall for delimiting the work chamber and the formation of the liquid duct. This in turn affords the possibility for the throttle unit to have an opening which allows a fluid connection between the work chamber and the liquid duct. With this configuration, the hydraulic bearing can be formed in a particularly compact manner.

A further advantageous configuration of the hydraulic bearing is distinguished by the fact that the throttle unit is formed in an annular manner with a central receiving region, wherein the control diaphragm and/or the actuator is or are arranged at least partially in the receiving region. With the control diaphragm and/or the actuator being arranged at least partially in the receiving region of the throttle unit, the hydraulic bearing can be formed in a particularly compact manner in the axial direction. Thus, it is possible for example for an armature of the actuator to be coupled directly to the control diaphragm. Alternatively, it is possible for an armature plunger, which is configured to connect the armature to the control diaphragm, to be formed in a particularly short manner. Both alternatives afford the advantage of a reduction in weight of the actuator, this in turn allowing an increase in the resonant frequency with respect to the actuator.

A further advantageous configuration of the hydraulic bearing is distinguished by the fact that the throttle duct is formed at least partially by a liquid duct of a throttle unit, wherein the throttle unit is arranged in the chamber housing on the associated first end side. This configuration can preferably be an alternative to the two previously explained configurations of the hydraulic bearing. With the throttle unit for example not being arranged in the main housing, but in the chamber housing, the hydraulic bearing can be shortened further in the axial direction, thereby affording advantageous compactness of the hydraulic bearing in the axial direction. Furthermore, this configuration affords the advantage that the throttle unit and thus at least partially also the throttle duct are particularly easy to produce and/or install. Thus, the throttle unit can be configured for example as a separate unit. In this case, in order to be installed, the throttle unit can be introduced into the work chamber and fastened there. With the throttle unit being arranged on the first end side of the chamber housing, it is particularly easily possible for hydraulic fluid, on flowing through the throttle duct, and thus also on flowing through the liquid duct of the throttle unit, to have to flow out of the work chamber first of all through the throttle unit before it can flow into the equalization chamber. This allows a particularly compact configuration of the chamber housing, since, as a result of the end-side arrangement, a particularly compact configuration of the throttle unit is made possible.

A further advantageous configuration of the hydraulic bearing is distinguished by the fact that the throttle unit is formed at least partially by a first end wall on the first end side of the chamber housing. Thus, the throttle unit and the chamber housing can be formed at least partially integrally. This allows particularly simple production.

A further advantageous configuration of the hydraulic bearing is distinguished by the fact that the throttle duct is formed at least partially by a liquid duct of a throttle unit, and that the throttle unit is formed at least partially by a casing wall in the region of the casing side portion of the main housing. This configuration of the hydraulic bearing can preferably be regarded as an alternative to the preceding configurations of the hydraulic bearing with the throttle unit. It was already explained above that the chamber housing is arranged with an associated first end side on the outer casing side portion of the main housing. With this casing side portion of the main housing also at least partially forming the throttle unit, the production of the hydraulic bearing can be made easier. This is because the throttle unit is in this case at least partially producible at the same time as the main housing is produced. In particular, it is possible for at least a part of the throttle unit to be formed by radially external recesses in the casing wall in the region of the casing side portion of the main housing.

An advantageous configuration of the hydraulic bearing is distinguished by the fact that the throttle unit is assigned a throttle disc having a passage opening which forms an opening of the throttle duct to the equalization chamber. If the throttle unit is formed at least partially by radially external recesses in the casing wall in the region of the casing side portion of the main housing, the liquid duct can be formed by the application and/or corresponding arrangement of the throttle disc above the radial-side recesses. This configuration allows particularly simple production of the liquid duct of the throttle unit.

A further advantageous configuration of the hydraulic bearing is distinguished by a connecting duct which forms at least a part of the throttle duct and which extends through the load-bearing spring and/or the main housing. The connecting duct can be formed for example by a bore through the load-bearing spring and/or the main housing. In addition, a tube, in particular a metal tube or a plastic tube, can be provided, which is inserted into the abovementioned bore. The connecting duct can serve to hydraulically connect the work chamber to the liquid duct of the throttle unit.

A further advantageous configuration of the hydraulic bearing is distinguished by a cover which is arranged on a second end side of the chamber housing. The cover can serve to close the chamber housing on the second end side, wherein the second end side faces away from the main housing. The cover can have an opening, in particular a ventilation opening. The ventilation opening can establish an air or gas connection between the additional chamber and the environment of the hydraulic bearing.

According to a second aspect of the invention, the object mentioned at the beginning is achieved by a vehicle which has: a vehicle frame, an engine, and an engine mount, configured as a hydraulic bearing, which produces a connection, with mounting action, between the engine and the vehicle frame. Thus, the engine mount can be formed by a hydraulic bearing according to one of the abovementioned configurations or examples. Therefore, the abovementioned advantages which have been explained in connection with the hydraulic bearing apply to the motor vehicle.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
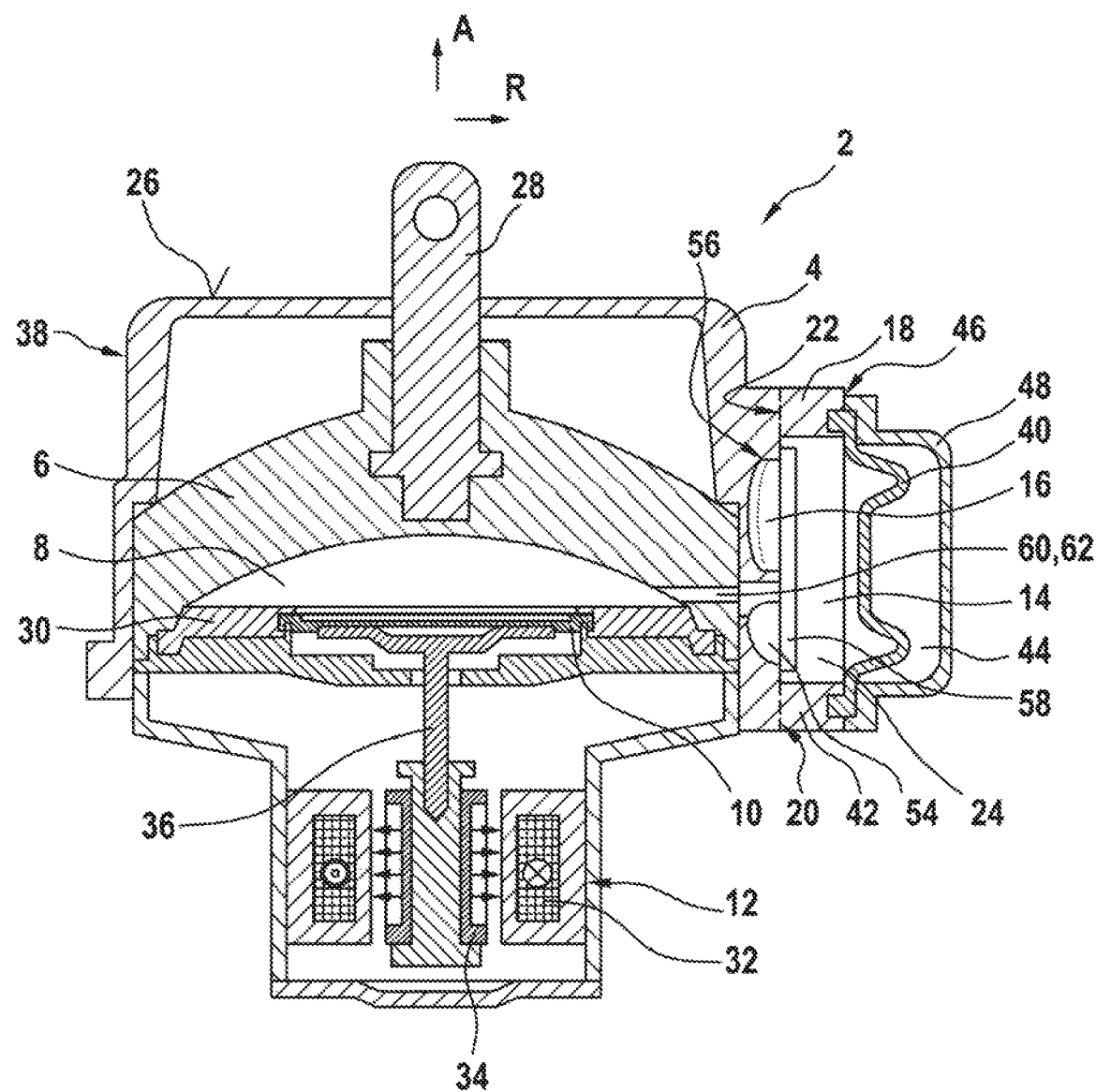
FIG. 1 is a schematic, in section, of the hydraulic bearing in a configuration variant according to the invention.

FIG. 1 shows a schematic sectional view of a hydraulic bearing 2. The hydraulic bearing 2 is configured preferably as an active hydraulic bearing 2. The hydraulic bearing 2 has a cylindrical main housing 4. Enclosed by the main housing 4 is a load-bearing spring 6. On an upper end side 26, the main housing 4 has an opening through which the load-bearing spring 6 is connectable to a fastening means 28. The fastening means 28 serves to fasten or connect the load-bearing spring 6 to a unit which is intended to be supported. Preferably, the fastening means 28 can be connected to an engine.

Furthermore, the hydraulic bearing 2 has a work chamber 8 at least partially enclosed by the load-bearing spring 6. To this end, the load-bearing spring 6 can be configured in a concave manner on its side facing away from the end side 26. A cavity formed by the concave configuration of the load-bearing spring 6 can help to form the work chamber 8 at least partially.

The underside of the load-bearing spring 6 is bounded by a partition 30. The partition 30 can thus also serve to delimit the work chamber 8. Centrally, a control diaphragm 10 can be formed by the partition 30. Alternatively, the control diaphragm 10 can be arranged centrally in the partition and in a manner tightly connected to the partition 30. The control diaphragm 10 is configured to be elastically deformable in the axial direction A of the hydraulic bearing 2. The axial direction A is also the axial direction A of the main housing 4.

Also provided for the hydraulic bearing 2 is an actuator 12. Preferably, the actuator 12 is an electromagnetic actuator 12. The actuator 12 is configured to deflect the control diaphragm 10 and thus is coupled to the control diaphragm 10. To this end, the actuator 12 can have a stator 32 and an armature 34. Preferably, the armature 34 is connected to an armature plunger 36, wherein the armature plunger 36 is mechanically coupled to the control diaphragm 10 such that a deflection of the control diaphragm 10 is able to be brought about by a deflection of the armature 34. As a result of the deflection of the control diaphragm 10, the volume of the work chamber 8 is able to be changed. The coupling between the actuator 12 and the control diaphragm 10 can therefore be used to dynamically control a dynamic stiffness of the hydraulic bearing 2.

Furthermore, the hydraulic bearing 2 has a throttle duct 16. The throttle duct 16 extends from the work chamber 8 to the equalization chamber 14 such that the work chamber 8 and the equalization chamber 14 are hydraulically connected by means of the throttle duct 16. The throttle duct 16 represents a hydraulic resistance for hydraulic fluid. If the pressure in the work chamber 8 rises for example as a result of a force being applied to the fastening element 28 and thus to the load-bearing spring 6, this causes hydraulic fluid to flow out of the work chamber 8, through the throttle duct 16, into the equalization chamber 14. If the pressure in the work chamber 8 drops, the hydraulic fluid can flow in the opposite direction from the equalization chamber 14, through the throttle duct 16, back into the work chamber 8. The hydraulic fluid is preferably a mixture of oil and water.

The hydraulic bearing 2 is also distinguished by a cylindrical chamber housing 18. The cylindrical chamber housing 18 is arranged with an associated first end side 20 on an outer casing side portion 22 of the main housing 4. The casing-side arrangement of the cylindrical chamber housing 18 affords the advantage that the hydraulic bearing 2 can be configured in a particularly compact manner in the axial direction A. This is because the equalization chamber 14 is formed at least by a part of an interior 24 of the chamber housing 18. Thus, in the axial direction A of the hydraulic bearing 2, no installation space needs to be provided for the equalization chamber 14 within the main housing 4, thereby reducing an overall length of the hydraulic bearing 2 in the axial direction A. Furthermore, the chamber housing 18 is not arranged in an encircling manner on the outer casing side of the main housing 4, but on a casing side portion 22 of the main housing 4. This casing side portion 22 forms only an especially small part of the casing-side outer surface of the main housing 4. Thus, the hydraulic bearing 2 can be arranged particularly tightly, with a further casing side portion 38 located opposite the casing side portion 22, on adjacent structural elements or on the component to be supported. This allows particularly good exploitation of the available installation space.

In order to form the equalization chamber 14, a rolling diaphragm 40 for the hydraulic bearing 2 can also be provided. The rolling diaphragm 40 is preferably fastened in an encircling manner to a casing wall 42 of the chamber housing 18, such that the rolling diaphragm 40 subdivides the interior 24 of the chamber housing 18 into the equalization chamber 14 and an additional chamber 44. Here, provision is preferably made for the rolling diaphragm 40 to be fastened to an end side 46, facing away from the main housing 4, of the chamber housing 18. For the force-fitting and/or form-fitting connection between the rolling diaphragm 40 and the chamber housing 18, a cover 48 can also be provided, which is fastened to the chamber housing 18 in a force-fitting and/or form-fitting manner and thus presses the rolling diaphragm 40 against the chamber housing 18.

The main housing 4 and the chamber housing 18 can, in one configuration variant, be formed at least partially integrally. Thus, it is possible for an integral transition from a casing wall of the main housing 4 to a casing wall of the chamber housing 18 to be formed. In this case, it is possible for example for only a part of the casing wall of the chamber housing 18 to be formed by this integral configuration. Alternatively, the entire casing wall of the chamber housing 18 can be formed integrally with a casing wall of the main housing 4.

According to an alternative configuration, the chamber housing 18 and the main housing 4 can be formed separately. In this case, the chamber housing 18 can be fastened to the main housing 4, for example in a force-fitting and/or form-fitting manner. In both alternative configurations, the chamber housing 18 projects in a radial direction R, or obliquely thereto, beyond a casing wall of the main housing 4.

Figure 2:
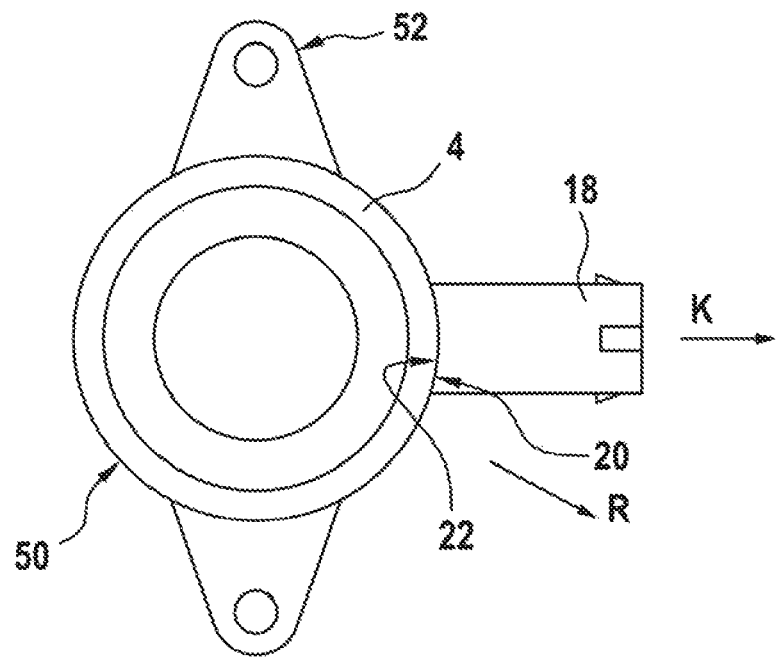
FIG. 2 is a schematic bottom view of the main housing of the hydraulic bearing in a further configuration variant according to the invention.

In FIG. 2, the main housing 2 is illustrated in a schematic bottom view. It can be seen here that the chamber housing 18 adjoins, with the associated first end side 20, only a part of the casing wall of the main housing 4, specifically the outer casing side portion 22 of the main housing 4. Thus, the remaining region 50 of the casing wall of the main housing 4 is free of the chamber housing 18.

Furthermore, it can be seen in FIG. 2 that an axial direction K of the cylindrical chamber housing 18 is oriented obliquely to the radial direction R of the main housing 4. Alternatively, provision can be made for the axial direction K of the cylindrical chamber housing 18 to be oriented in a radial direction R of the main housing 4.

Figure 3:
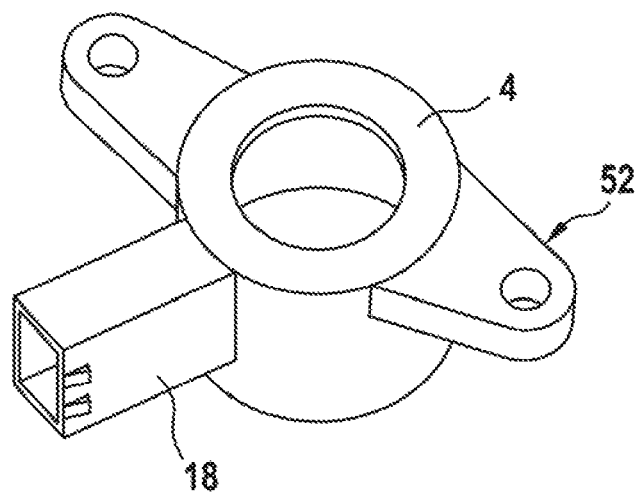
FIG. 3 is a schematic perspective view of the main housing of the hydraulic bearing in a further configuration variant according to the invention.

In FIG. 3, the main housing 4 is illustrated in a schematic perspective view. It can be seen here that at least a part of the chamber housing 18 can be formed integrally with the main housing 4. Furthermore, holders 52 of the main housing 4, which serve for fastening the hydraulic bearing 2, are illustrated in FIG. 3. Thus, supporting of two elements can be ensured, wherein one of the elements is fastenable to the holders 52 and the other element is fastenable to the fastening element 28.

Considering FIG. 1 again, it can also be seen therein that at least a part of the throttle duct 16 is also formed by the casing side portion 22 on which the cylindrical chamber housing 18 is arranged. Therefore, for a preferred configuration, provision is made for the throttle duct 16 to be formed at least partially by a liquid duct 54 of a throttle unit 56, and for the throttle unit 56 to be formed at least partially by a casing wall in the region of the casing side portion 22 of the main housing 4. The throttle unit 56 and the main housing 4 can thus be formed at least partially integrally. It can furthermore be seen in FIG. 1 that the main housing 4 has, in the region of the casing side portion 22, recesses which can be assigned to the liquid duct 54. In order now to form a closed duct, it is also possible for a throttle disc 58 to be provided, which cooperates with the casing wall in the region of the casing side portion 22 of the main housing 4 such that the liquid duct 54 can be formed. A further advantageous configuration of the hydraulic bearing is therefore distinguished by the fact that the throttle unit 56 is assigned a throttle disc 58 having a passage opening 60 (as shown for example in FIG. 5) which forms an opening of the throttle duct 16 to the equalization chamber 14.

Figure 4:
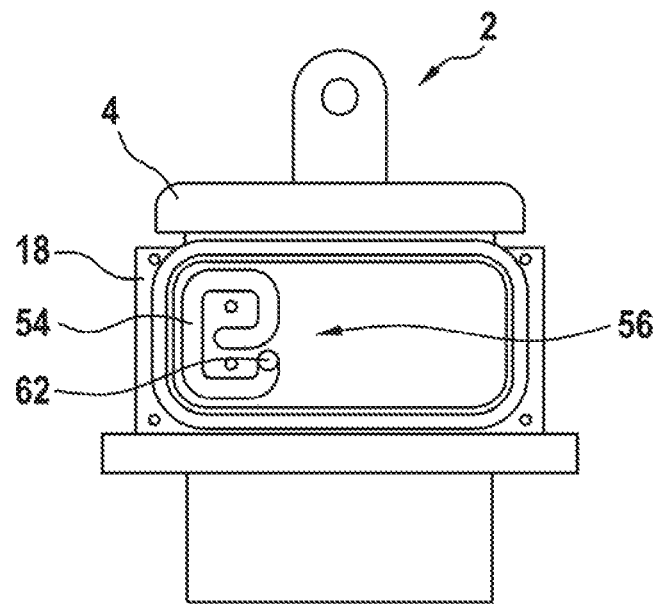
FIG. 4 is a first schematic perspective view into the work chamber of the hydraulic bearing in a further configuration variant of the invention.

FIG. 4 illustrates a first side view of the chamber housing 18. The view is in this case selected such that the liquid duct 54 can be seen. Preferably, the liquid duct 54 is formed in a helical and/or serpentine manner. A first end of the liquid duct 54 is connected to the connecting duct 62. This connecting duct 62 is also shown in FIG. 1. Preferably, the connecting duct 62 extends through the load-bearing spring 6 and the main housing 4. The connecting duct 62 can thus establish a hydraulic connection between the work chamber 8 and the liquid duct 54. Thus, the connecting duct 62 can form at least a part of the throttle duct 16. The connecting duct 62 can be configured by a bore and/or a tube.

Figure 5:
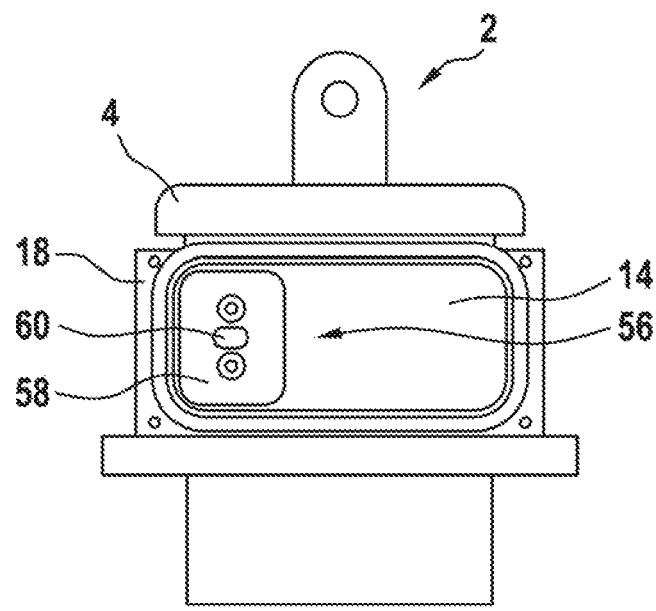
FIG. 5 is a second schematic perspective view into the work chamber of the hydraulic bearing in the abovementioned configuration variant of the invention.

The second end of the liquid duct 54 ends at the passage opening 60 in the throttle disc 58, as can be gathered from viewing FIGS. 4 and 5 together. FIG. 5 in this case shows a further side view into the chamber housing 18 of the hydraulic bearing 2. The throttle disc 58 has in this case been placed on the recesses in the casing wall in the region of the casing side portion 22 of the main housing 4 such that, between the casing wall 4 and the throttle disc 58, the liquid duct 54 is formed.

Figure 6:
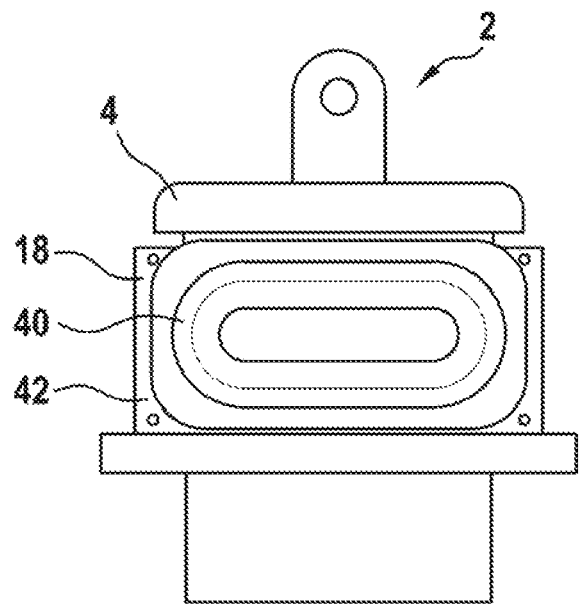
FIG. 6 is a third schematic perspective view into the work chamber of the hydraulic bearing in the abovementioned configuration variant of the invention.

FIG. 6 shows a further side view into the chamber housing of the hydraulic bearing 2. In this case, it can be seen from FIG. 6 that a rolling diaphragm 40 is fastened in an encircling manner to the casing wall 42 of the chamber housing 18. The rolling diaphragm 40 can thus separate off a part of the interior of the chamber housing 18 for the equalization chamber 14.

Figure 7:
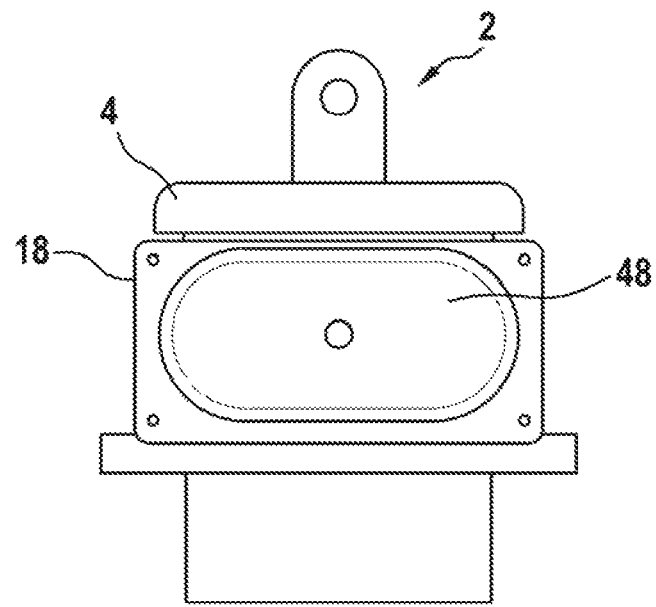
FIG. 7 is a fourth schematic perspective view into the work chamber of the hydraulic bearing in the abovementioned configuration variant of the invention.

In order to protect the rolling diaphragm 40, a cover 48 can be fastened to the outer end side of the chamber housing 18, as can be seen in FIG. 7. By way of the cover 48, the rolling diaphragm can also be fastened to the casing wall 42 of the chamber housing 18.

Figure 8:
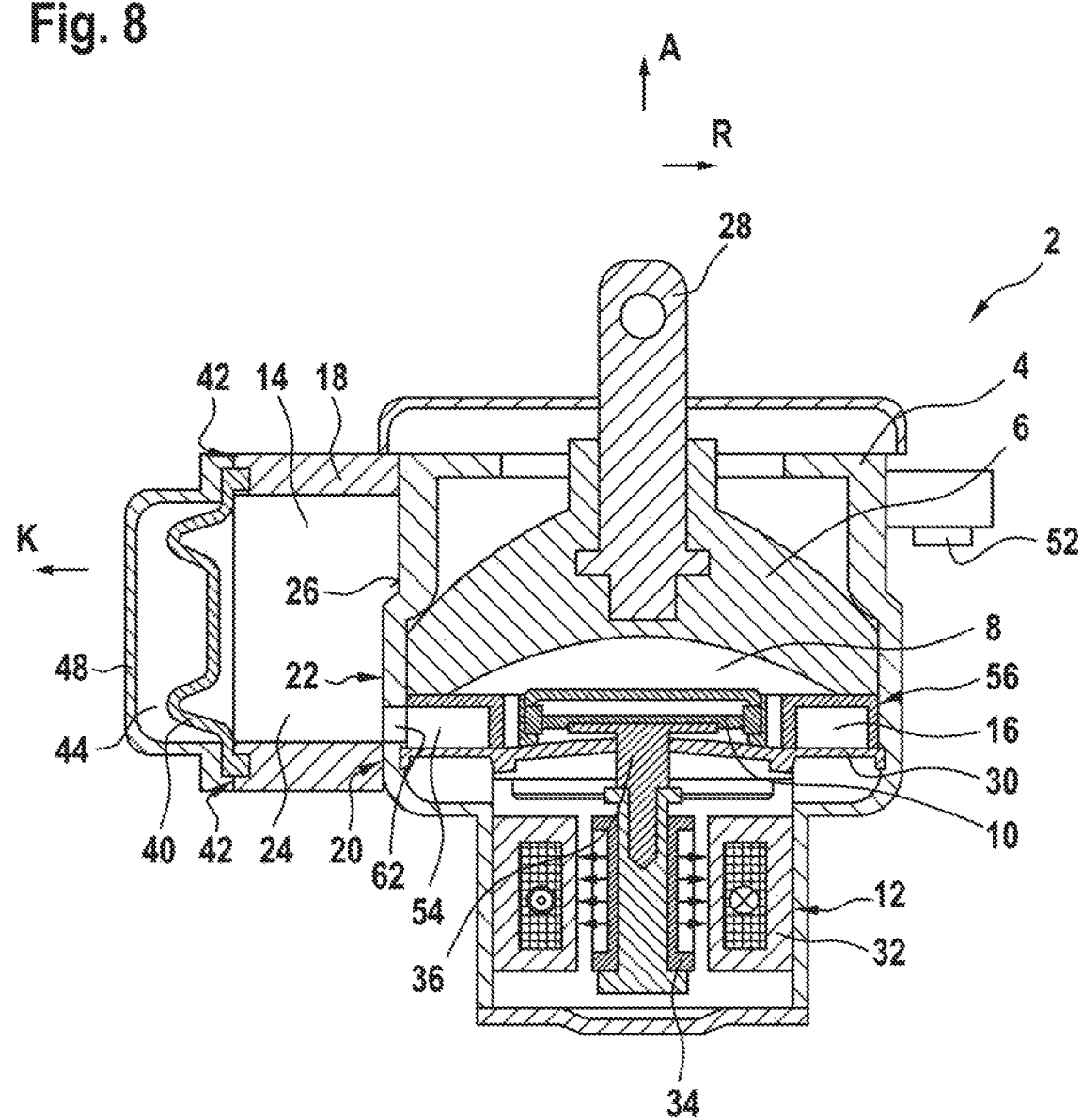
FIG. 8 is a schematic, in section, of the hydraulic bearing in a further configuration variant according to the invention; and, FIG. 9 is a schematic perspective illustration of the throttle unit in a configuration variant according to the invention.

FIG. 8 schematically illustrates an alternative configuration variant of the hydraulic bearing 2. Where appropriate, reference is made to the previous explanations, in particular with respect to FIG. 1. The configuration variant illustrated in FIG. 8 differs from the configuration of the hydraulic bearing shown in FIG. 1 in particular by the arrangement and configuration of the throttle unit 56.

For the hydraulic bearing 2 shown in FIG. 8, provision is preferably made for the throttle duct 16 to be formed at least partially by the liquid duct 54 of the throttle unit 56, wherein the throttle unit 56 is arranged in the main housing 4 beneath the load-bearing spring 6. Thus, the throttle unit 56 adjoins the work chamber 8 at least partially with an associated end side. The end side, facing away from the work chamber 8, of the throttle unit 56 can be adjoined by a partition 30 which extends in a radial direction between the casing wall of the main housing 4. The partition 30 can in this case be configured to cover or close the end side of the liquid duct 54.

In FIG. 9, the throttle unit 56 is schematically shown in a perspective view. It can be seen here that the liquid duct 54 is preferably configured in a helical manner. At a first end 64, the liquid duct 54 transitions into an end-side opening in the throttle unit 56. Thus, by means of the opening, a fluid connection can be formed between the liquid duct 54 and the work chamber 8. A second end 66 of the liquid duct 54 ends in a radial-side opening in the throttle unit 56, wherein the latter transitions into the connecting duct 62 such that, as illustrated in FIG. 8, a fluid connection can be formed between the equalization chamber 14 and the liquid duct 54. Preferably, the throttle unit 56 is configured as a separate element. To this end, the throttle unit 56 can be pushed into the interior of the main housing 4 during installation. This makes production easier.

Furthermore, it has proven advantageous for the throttle unit 56 to be formed in an annular manner with a central receiving region 68, wherein the control diaphragm 10 and/or at least a part of the actuator 12 is or are arranged at least partially in the receiving region 68. This allows a particularly compact configuration of the hydraulic bearing 2 in the axial direction A.

It is understood that the foregoing description is that of the preferred embodiments of the invention and that various changes and modifications may be made thereto without departing from the spirit and scope of the invention as defined in the appended claims.

LIST OF REFERENCE SIGNS (Part of the Description)
A Axial direction of the main housing
R Radial direction of the main housing
K Axial direction of the chamber housing
2 Hydraulic bearing
4 Main housing
6 Load-bearing spring
8 Work chamber
10 Control diaphragm
12 Actuator
14 Equalization chamber
16 Throttle duct
18 Chamber housing
20 First end side
22 Casing side portion
24 Interior of the chamber housing
26 End side of the main housing
28 Fastening element
30 Partition
32 Stator
34 Armature
36 Armature plunger
38 Further casing side portion
40 Rolling diaphragm
42 Casing wall of the chamber housing
44 Additional chamber
46 Further end side of the chamber housing
48 Cover
50 Region of the casing wall of the main housing
52 Holder
54 Liquid duct
56 Throttle unit
58 Throttle disc
60 Passage opening
62 Connecting duct
64 First end
66 Second end
68 Receiving region

What is claimed is:
1. A hydraulic bearing comprising:
a cylindrical main housing having an outer casing side;
a load-bearing spring enclosed by the main housing;
a work chamber at least partially enclosed by said load-bearing spring;
said work chamber defining a work chamber volume filled with hydraulic fluid;
a control diaphragm configured to change said work chamber volume;
an actuator coupled to said control diaphragm for deflecting said control diaphragm;

an equalization chamber;
a throttle duct extending from said work chamber to said equalization chamber to hydraulically interconnect said work chamber and said equalization chamber;
a cylindrical chamber housing defining an interior and having a first end face on a section of said outer casing side of said main housing;
said equalization chamber being formed by at least a part of said interior of said cylindrical chamber housing;
a throttle unit; said throttle duct being formed at least partially by a liquid duct of said throttle unit; and, said throttle unit being formed at least partially by a casing wall in the region of said casing side of said main housing; and
wherein said throttle unit is assigned a throttle disc having a passage opening which forms an opening of said throttle duct to said equalization chamber.

2. The hydraulic bearing of claim 1, further comprising a rolling diaphragm fastened in an encircling manner to a casing wall of said chamber housing so as to permit the rolling diaphragm to subdivide said interior of said cylindrical chamber housing into said equalization chamber and an additional chamber.

3. The hydraulic bearing of claim 1, wherein said cylindrical chamber housing defines an axial direction A oriented in a radial direction R of said main housing or obliquely to said radial direction R of said main housing.

4. The hydraulic bearing of claim 1, wherein said main housing and said chamber housing are formed at least partially integrally.

5. The hydraulic bearing of claim 1, wherein said main housing and said chamber housing are formed separately; and, said chamber housing is fastened to said main housing.

6. The hydraulic bearing of claim 1, wherein said main housing has said throttle unit arranged therein beneath said load-bearing spring; and, said throttle duct is formed at least partially by a liquid duct of said throttle unit.

7. The hydraulic bearing of claim 6, wherein said throttle unit is formed in an annular manner with a central receiving region, wherein said control diaphragm and/or said actuator is or are arranged at least partially in a receiving region.

8. The hydraulic bearing of claim 1, wherein said throttle unit is arranged in said chamber housing on said first end face; and, said throttle duct being formed at least partially by a liquid duct of said throttle unit.

9. The hydraulic bearing of claim 1, wherein said throttle unit is formed at least partially by a first end wall on said first end face of said chamber housing.

10. The hydraulic bearing of claim 1, wherein a connecting duct forms at least a part of said throttle duct and extends through said load-bearing spring and/or said main housing.

11. The hydraulic bearing of claim 1, wherein a cover is arranged on a second end face of said chamber housing.

12. A motor vehicle comprising:
a vehicle frame,
an engine; and,
a hydraulic bearing including:
a cylindrical main housing having an outer casing side;
a load-bearing spring enclosed by the main housing;
a work chamber at least partially enclosed by said load-bearing spring;
said work chamber defining a work chamber volume filled with hydraulic fluid;
a control diaphragm configured to change said work chamber volume;
an actuator coupled to said control diaphragm for deflecting said control diaphragm;
an equalization chamber;
a throttle duct extending from said work chamber to said equalization chamber to hydraulically interconnect said work chamber and said equalization chamber;
a cylindrical chamber housing defining an interior and having a first end face on a section of said outer casing side of said main housing;
said equalization chamber being formed by at least a part of said interior of said cylindrical chamber housing;
a throttle unit; said throttle duct being formed at least partially by a liquid duct of said throttle unit; and, said throttle unit being formed at least partially by a casing wall in the region of said casing side of said main housing; and
wherein said throttle unit is assigned a throttle disc having a passage opening which forms an opening of said throttle duct to said equalization chamber.

13. A hydraulic bearing comprising:
a cylindrical main housing having an outer casing side;
an equalization chamber;
a throttle duct to hydraulically interconnect a work chamber and an equalization chamber;
a cylindrical chamber housing defining an interior and having a first end face on a section of said outer casing side of said main housing;
a throttle unit assigned a throttle disc having a passage opening which forms an opening of said throttle duct to said equalization chamber.

14. The hydraulic bearing of claim 13, wherein the throttle duct is at least partially formed by a liquid duct of the throttle unit.

15. The hydraulic bearing of claim 13, wherein the throttle unit is formed at least partially by a casing wall of the main housing.

16. The hydraulic bearing of claim 13, wherein the throttle duct extends from the work chamber to the equalization chamber.

17. The hydraulic bearing of claim 13, further comprising a load bearing spring enclosed by the main housing.

* * * * *